United States Patent [19]
Goossen et al.

[11] Patent Number: 5,654,819
[45] Date of Patent: Aug. 5, 1997

[54] MICROMECHANICAL MODULATOR

[75] Inventors: Keith Wayne Goossen, Aberdeen; James Albert Walker, Howell, both of N.J.

[73] Assignee: Lucent Technologies Inc., Murray Hill, N.J.

[21] Appl. No.: 478,590

[22] Filed: Jun. 7, 1995

Related U.S. Application Data

[63] Continuation-in-part of Ser. No. 187,676, Jan. 27, 1994, Pat. No. 5,500,761.
[51] Int. Cl.⁶ .................................................. G02B 26/00
[52] U.S. Cl. .................................... 359/291; 359/248
[58] Field of Search ........................... 359/290, 291, 359/292, 293, 294, 295, 247, 248, 263, 276

[56] References Cited

U.S. PATENT DOCUMENTS 5,500,761  3/1996  Goossen et al. ...................... 359/290

*Primary Examiner*—Georgia Y. Epps
*Assistant Examiner*—Dawn-Marie Bey

[57] ABSTRACT

A method and apparatus for modulating an optical signal, and a method for fabricating such an apparatus, are disclosed. The modulator comprises a membrane, which consists of at least three layers, and a substrate, spaced to form an air gap. The layers of the membrane are characterized by a relationship between the refractive indices of the layers and the refractive index of the substrate. The membrane is suspended in a first position over the substrate by a flexible support arrangement. A biasing force is applied to the membrane and the substrate to create an electrostatic force to move the membrane towards the substrate to a second position. The reflectivity of the device to an optical signal changes as the membrane moves from the first position to the second position, thereby modulating the signal.

25 Claims, 11 Drawing Sheets

MICROMECHANICAL MODULATOR

This case is a continuation in part of Ser. No. 08/187,676 filed Jan. 27, 1994, now U.S. Pat. No. 5,500,761.

FIELD OF INVENTION

This invention relates generally to optical modulators, and more particularly to surface normal mechanical optical modulators having a wide operating bandwidth.

BACKGROUND OF INVENTION

It is desirable in optical wavelength-division-multiplexing networks to have inexpensive light modulators that have high contrast and wide optical bandwidths. In certain cases, such as audio and video transmission, these modulators need only operate at frequencies up to several megahertz.

A modulation device particularly well suited for the above application is a surface normal micromechanical modulator. This device may be described as having a variable air gap defined by two layers of material. Typically, surface normal light modulators operate by changing the amount of light reflected in the surface normal direction, i.e., the direction normal to the substrate surface. This may be achieved by varying the variable air gap, which alters the optical properties of the device.

One such micromechanical modulator has been described by Aratani et al. in "Process and Design Considerations for Surface Micromachined Beams for a Tuneable Interferometer Array in Silicon," Proc. IEEE Microelectromech. Workshop, Ft. Laud., Fla., Feb. 7–10, 1993 at 230–35. This article, and all other articles referenced in this specification are herein incorporated by reference in their entirety. Aratani's modulator is described as having a diaphragm mirror consisting of a polysilicon/silicon nitride multilayer supported by thin beams over a substrate, also partially mirrored by a polysilicon/silicon oxide multilayer. As a voltage is applied between the membrane and the substrate, the membrane is pulled toward the substrate. The device is reported to behave as a Fabry-Perot interferometer wherein, given two mirrors having equal reflectivity, the reflectivity of the device approaches zero at the resonant wavelength of the cavity. As the membrane moves, altering the cavity, the reflectivity of the device rises. The change in reflectivity modulates the optical signal. While a large change in reflectivity is supposedly achieved, the optical bandwidth of the optical resonator based modulator is limited. The contrast ratio of such a device falls off sharply as the wavelength of the incident light varies from the resonant wavelength of the device.

A second micromechanical modulator was described by Solgaard et al. in "Deformable Grating Optical Modulator," Optics Lett. 17(9) 688–90 (1992). This modulator was described as having a reflection phase grating of silicon nitride beams that is coated with metal and suspended over a substrate coated with metal. An air gap separates the grating and substrate. In the absence of a biasing voltage, the path length difference between the light reflected from the grating beams and that reflected from the substrate is equal to the wavelength of the incoming light. These reflections are therefore in phase, and the device reflects the light in the manner of a flat mirror. When a voltage is applied between the beams and the substrate, the beams are brought in contact with the substrate. The total path length difference between the light reflected from the grating beams and that reflected from the substrate changes to one half of the wavelength of the incident light. In this case, the reflections interfere destructively, causing the light to be diffracted.

The deformable grating optical modulator does not achieve a low reflectivity state. Rather, it switches to a diffracting state. In the diffracting state, incident light is scattered into higher-order diffraction modes of the grating, so that the amount of light reflected into the zero order (surface-normal) mode is minimized. Such diffraction may be an undesirable aspect of the deformable grating optical modulator. If the numerical aperture of the incoming fiber or detection system is large enough to pick up the higher order diffraction modes, a degradation in contrast will result. Further, if this device is implemented in a system using arrays of optical beams or fibers, a significant crosstalk may be introduced.

In operation, the movable layer, such as the beams of Solgaard's modulator, may contact the substrate layer when bias voltage is applied. In other "non-contacting" designs, the movable layer may move toward the substrate layer, but not contact it, thus maintaining an air gap. Each operating mode has its drawbacks. It is expected that the former design ("contacting designs") would have a shorter operating life, relative to the non-contacting design, due to the repeated contact of the movable layer with the substrate layer. On the other hand, non-contacting designs typically have a much more limited bandwidth than contacting designs.

Accordingly, there is a need for a non-contacting micromechanical modulator which provides high contrast modulation for optical signals over broader range of wavelengths than previous designs.

SUMMARY OF THE INVENTION

An apparatus for modulating an optical signal, and a method for its fabrication, are disclosed. The apparatus, which may be formed on a semiconductor wafer or chip, comprises a membrane and a substrate spaced to form an air gap. In one embodiment, the membrane consists of three or more layers suspended over the substrate by support arms. There is a specific relationship between the refractive indices of the membrane layers and the refractive index of the substrate, and the membrane layers have specific thickness. A bias voltage is applied to the membrane and the substrate to generate an electrostatic force to move the membrane towards the substrate.

The air gap, in the unbiased state, may be a multiple of one-quarter of a wavelength of the optical signal. If the air gap is an odd multiple of one-quarter wavelength, the membrane and air gap function as a high reflectivity coating. If the air gap is an even multiple of one-quarter wavelength, the membrane and air gap function as an anti-reflection coating. Under the action of bias, the membrane moves through about one-quarter of a wavelength to an anti-reflection state or a maximum reflection state depending upon the state of the unbiased membrane. The membrane's change in reflectivity facilitates modulating the optical signal. In a preferred embodiment, the membrane does not contact the substrate under the action of bias.

In one embodiment, the apparatus may be fabricated by providing a conductive substrate and forming a three-layer conductive membrane on the substrate so that an air gap is defined between the membrane and the substrate. The upper and lower layers of the membrane protect the middle layer during fabrication and all three layers are formed in such a manner that the second derivative of the anti-reflecting spectrum is zero at the center wavelength providing a broader operating optical bandwidth than typical non-contacting modulator designs.

BRIEF DESCRIPTION OF THE DRAWINGS

Further features of the invention will become more apparent from the following detailed description of specific embodiments thereof when read in conjunction with the accompanying drawings, in which like elements have like reference numerals and in which:

FIGS. 12–15b show successively the formation of the modulator of FIG. 11, where FIGS. 12, 13, 14a and 15a are sideviews, and FIGS. 14b and 15b are plan views;

DETAILED DESCRIPTION OF THE INVENTION

Figure 1:
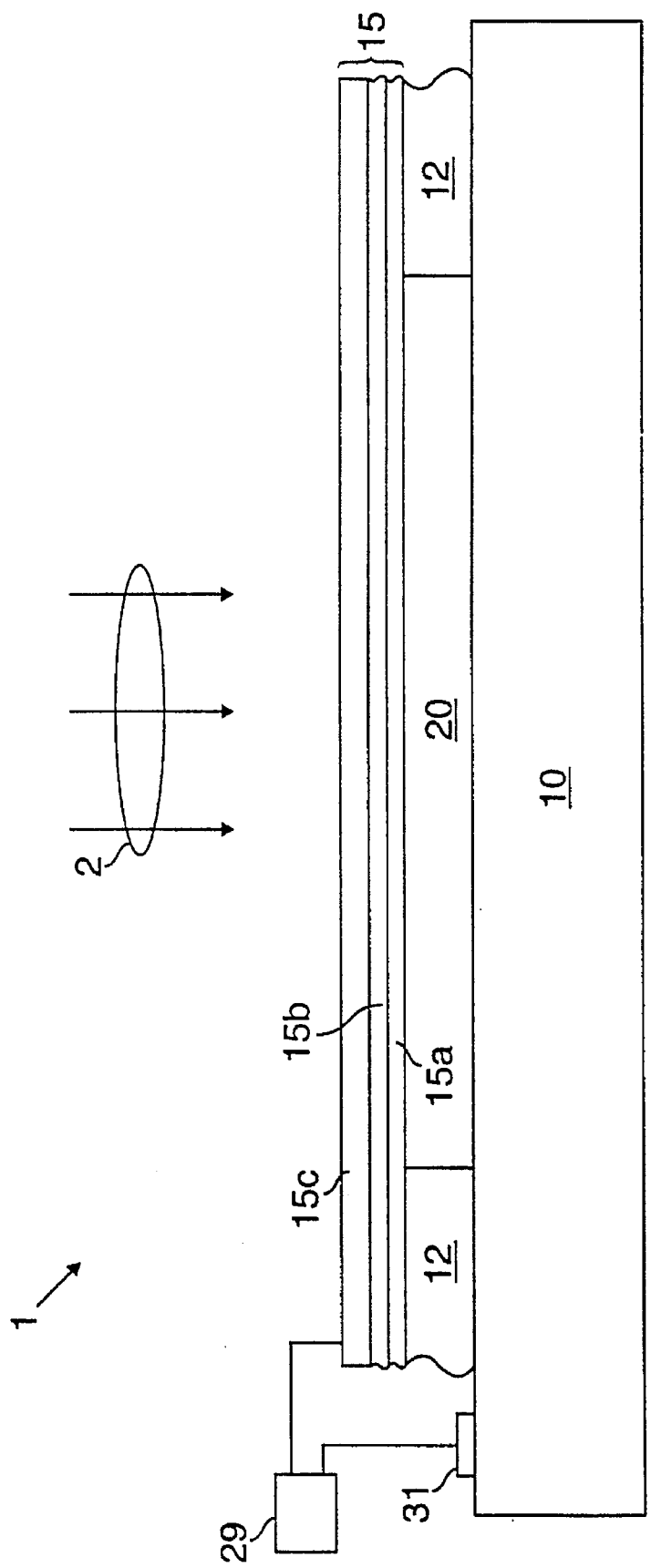
FIG. 1 is a side view of an embodiment of a micromechanical modulator according to the present invention where the modulator is shown in its unbiased position.
Figure 2:
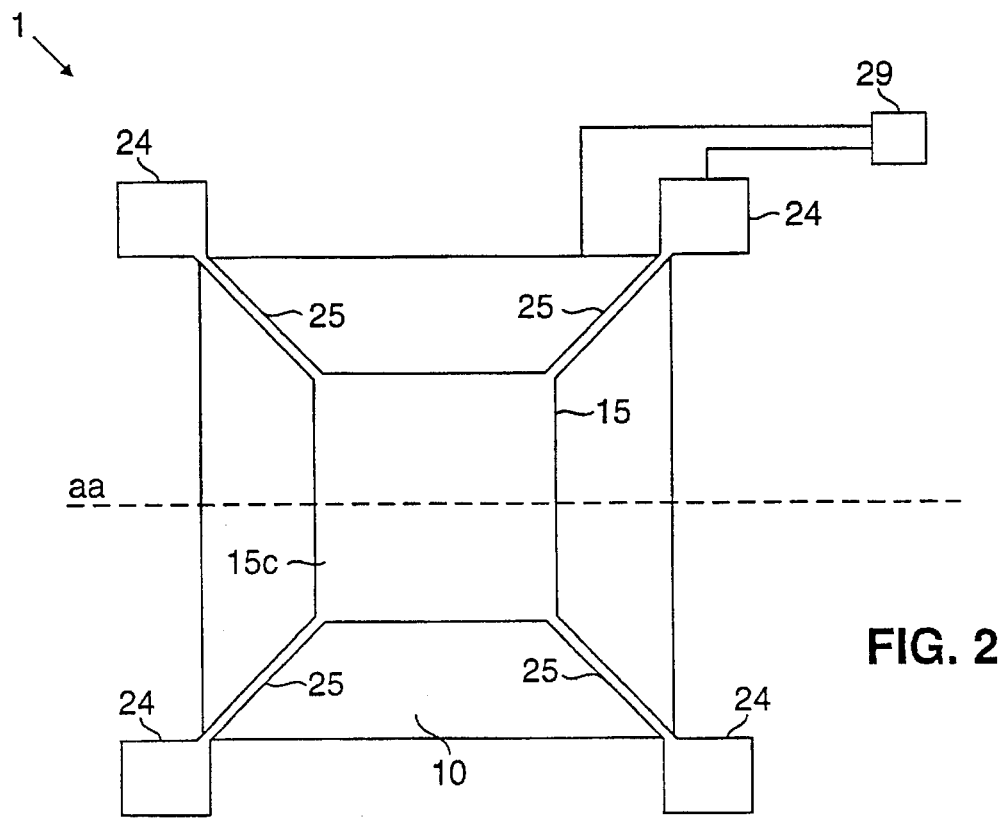
FIG. 2 is a plan view of the micromechanical modulator of FIG. 1.

FIGS. 1 and 2 show a preferred embodiment of a micromechanical modulator 1 according to the present invention. As shown in FIG. 1, which is a cross-sectional view through line aa in FIG. 2, the device comprises a substrate 10 and a membrane 15 having three layers, such as layers 15a, 15b and 15c. The membrane 15 and substrate 10 are spaced from each other defining an air gap 20. As shown in FIG. 2, which is a plan view of the apparatus of FIG. 1, the membrane 15 is suspended over the air gap 20 by support arms 25. The substrate and the layers 15a or 15c should be suitably conductive so that a voltage may be applied across the membrane 15 and the substrate 10 to generate an electrostatic force to move the membrane towards the substrate.

Figure 2A:
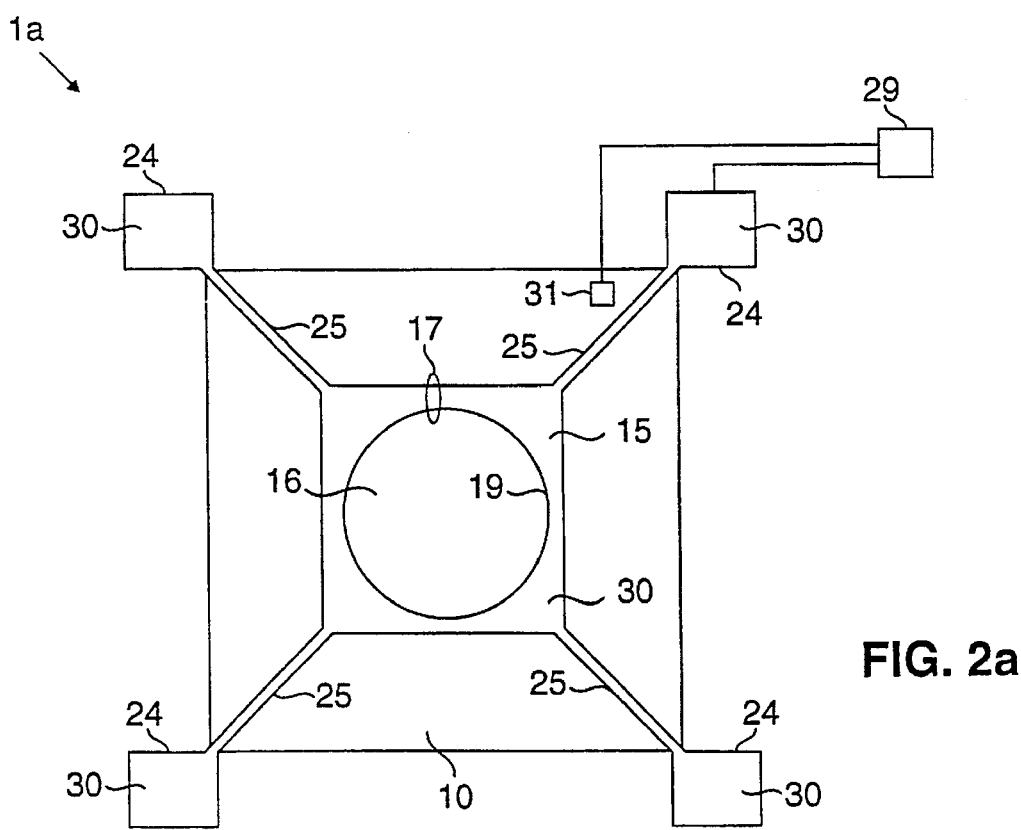
FIG. 2a is a plan view of a second embodiment of a micromechanical modulator according to the present invention wherein a conductive layer is deposited on top of the membrane and support arms.

The voltage may be supplied by a controlled voltage source 29. If neither the substrate 10 nor any of the layers comprising the membrane 15 are conductive, electrodes should be provided. For example, as shown in FIG. 2a, an electrode 30 comprising a layer of conductive material may be disposed on the membrane. If the substrate is non-conductive, an electrode may be formed in the substrate by doping the substrate with suitable materials, such as, without limitation, boron, phosphorus and antimony. Doping methods include ion implantation, selective diffusion and other methods known to those skilled in the art. The devices 1 and 1a may be suitably formed on a semiconductor chip or wafer.

Preferably, the substrate 10 is formed of a conductive material, which is either transparent or absorbing over the operating optical bandwidth. Suitable substrate materials include, but are not limited to, silicon, gallium arsenide, indium phosphide, germanium or indium tin oxide (ITO) coated glass. If a semiconductor material is used for the substrate, it should preferably be appropriately doped. For example, if the substrate is silicon, it is preferably doped with any Group III or Group V element, typically phosphorus or boron. Such doping should enhance device speed.

The membrane 15 shown in FIGS. 1 and 2 is comprised of the layer 15b of material which is characterized as having a refractive index which is approximately equal to the square root of the refractive index of the substrate 10. The layer 15b functions as a reflection/anti-reflection layer as will be described below. Suitable materials for the layer 15b include, without limitation, silicon oxide, or, more preferably, silicon nitride. The membrane 15 is also comprised of the layers 15a and 15c. These layers are characterized by a refractive index which is approximately equal to the refractive index of the substrate 10. The layers 15a and 15c will typically be formed of the same material as the substrate 10, preferably silicon. If silicon is used for the layers 15a and 15c, it may have a polycrystalline structure, such as polysilicon, or it may have an amorphous or single crystal structure. The layers 15a or 15c, or both, function as strained layers for producing tension in the membrane 15. These layers allow the mechanical properties of the modulator to be tailored independently of the optical properties. In particular, the overall stress in the membrane 15 may be tailored by adjusting the stress in the layers 15a or 15c, or both. This is particularly advantageous where layer 15b is silicon nitride, the preferred material for this layer, since the stress in a silicon nitride layer cannot be tailored independently of its refractive index. Further, the layers 15a and 15c protect the layer 15b during etching steps, described later in this specification. Furthermore, in conjunction with the other two layers, incorporating the layer 15c into the membrane 15 results in a broadened optical bandwidth relative to a non-contacting modulator having a two-layer membrane, such as described in Ser. No. 08/187,676.

The thickness of the layers 15a and 15b of the membrane 15 is preferably about one-quarter of a wavelength (as measured in the material comprising the layer) of an incident optical beam 2. The layer 15c is preferably about one-half of a wavelength (as measured in the material comprising the layer) of the incident optical beam 2. Where the incident optical beam 2 is characterized by a single wavelength, the membrane thickness is readily determined. The incident optical beam 2 may, however, be comprised of a number of spectral components of differing wavelengths. For example, the incident optical beam 2 may have a bandwidth extending from 1400 nm to 1700 nm. In such a case, the wavelength selected as the basis (the basis wavelength) for the membrane thickness is determined by selecting the wavelength at the mid-point, i.e., the center wavelength, of the bandwidth. The center wavelength is 1550 nm for the previous example. Some loss in modulator performance, i.e., contrast, is expected as the wavelength of the spectral components deviates from the basis wavelength. As previously discussed, by incorporating layer 15c, the optical bandwidth of the modulator is broadened so that contrast remains high at a greater deviation from the basis wavelength than for a non-contacting modulator having a one or two layer membrane. This is discussed below in conjunction with FIG. 18.

Figure 3:
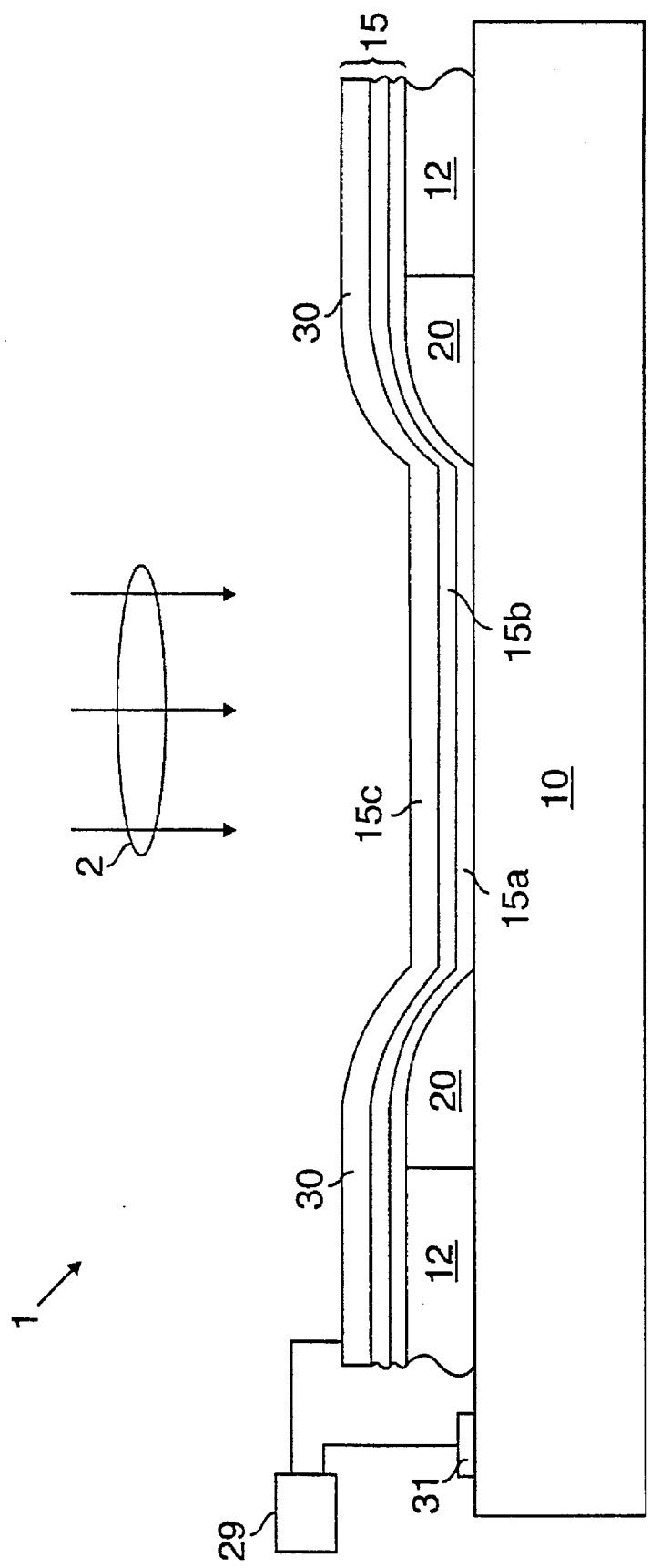
FIG. 3 is a side view of the modulator of FIG. 1 under bias.

The height of the air gap 20, i.e., the distance between the membrane 15 and substrate 10, may be a multiple of about one-quarter of the basis wavelength in the unbiased position. In other words, the air gap 20 may be $m\lambda/4$, where m is an integer. If the air gap 20, in the unbiased position, is an odd multiple of one-quarter of the basis wavelength, the membrane 15 and air gap 20 function as a high reflection mirror. If the air gap 20 is an even multiple of one-quarter of the basis wavelength, the membrane and air gap serve as a anti-reflection coating for the substrate 10. As an electrical signal, such as a varying voltage, is applied to the membrane 15 and substrate 10, an electrostatic force is generated between them. This force causes the membrane to move toward the substrate, as shown in FIG. 3. As the membrane 15 moves from its unbiased position, the reflectivity of the device changes. As the membrane 15 moves one-quarter of the basis wavelength, a minimum or maximum reflectivity state will be encountered, depending upon the state of the membrane 15 in the unbiased position.

The aforementioned behavior is a function of the relationship of the refractive index of the membrane layer 15b to the refractive index of the substrate 10, as well as the thickness of the layer 15b. If the refractive index of the membrane is about equal to the square root of the refractive index of the substrate, an anti-reflection condition can be created. This relationship is well known to those skilled in the art. See Condon and Odishaw, ed., "Handbook of Physics," at 6-102–6-103, (2nd ed., McGraw-Hill, 1967). Modulation of an optical signal is thus achieved by altering the reflectivity of the device.

As previously described, maximum and minimum reflectivity states are observed at integer multiples of one-quarter of the basis wavelength. Notwithstanding, in a presently preferred embodiment, the unbiased air gap 20 is approximately 0.65 to 0.7 times the basis wavelength. The reason for this deviation is as follows.

Figure 18:
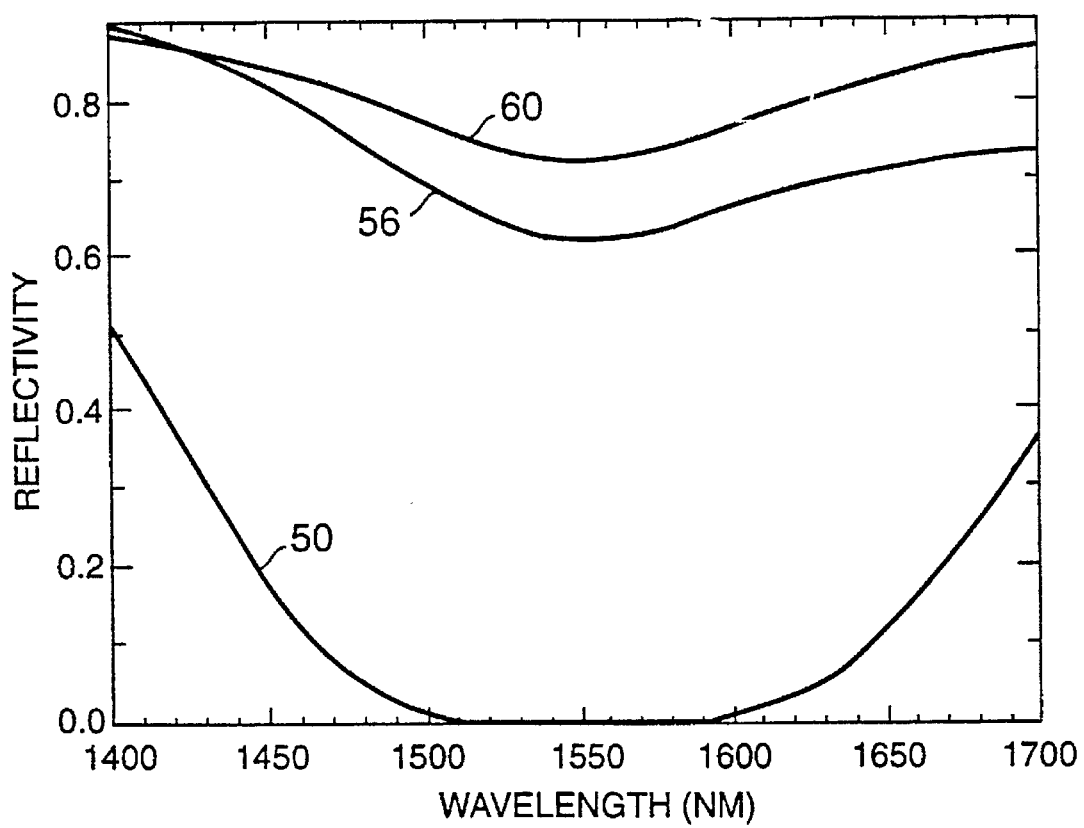
FIG. 18 is a plot of reflectivity vs. wavelength of the optical signal for a modulator according to the present invention.

An instability exists when the membrane 15 travels toward the substrate 10 a distance of at least one-third of the height of the unbiased air gap 20 in moving from its unbiased to its biased position. This instability causes the membrane 15 to be drawn to and contact the substrate 10. While the modulators described herein can function when the membrane 15 contacts the substrate, in the preferred embodiment such contact does not occur. One way to avoid the instability is to provide a relatively large air gap so that the membrane travel distance of one-quarter of the basis wavelength is a small fraction, i.e., less than one-third, of the height of the unbiased air gap. But, the larger the air gap, the greater the bias voltage requirement. An instability results when m equals 2 or 3 since, for m=2, the travel distance is one-half of the unbiased air gap: $[(2)\lambda/4-\lambda/4]/(2)\lambda/4=0.5$ and for m=3, since the travel distance is exactly one-third of the unbiased air gap: $[(3)\lambda/4-\lambda/2]/(3)\lambda/4=0.33$. If, however, the air gap 20 in its unbiased state is somewhat less than $3\lambda/4$, such as from about $0.65\lambda$ to about $0.7\lambda$, and the air gap 20 in its biased state is about $\lambda/2$, the instability will be avoided. While the modulator will not be at a maximum reflectivity due to this deviation, the contrast ratio remains high since reflectivity approaches zero in the low reflectivity state, as shown in FIG. 18. By sacrificing some reflectivity, bias voltage requirements are minimized and the instability is avoided.

The above-described instability is believed to be due to the nature of the electrostatic force being applied. A mechanical stop could be located underneath the membrane 15 to prevent the membrane from contacting the substrate 10 even when operated in the instability region. If such a stop is incorporated into the modulator, it must not block the optical signal 2 from reaching the substrate 10. Repeated contact with the mechanical stop would, however, presumably shorten modulator life.

Figure 4:
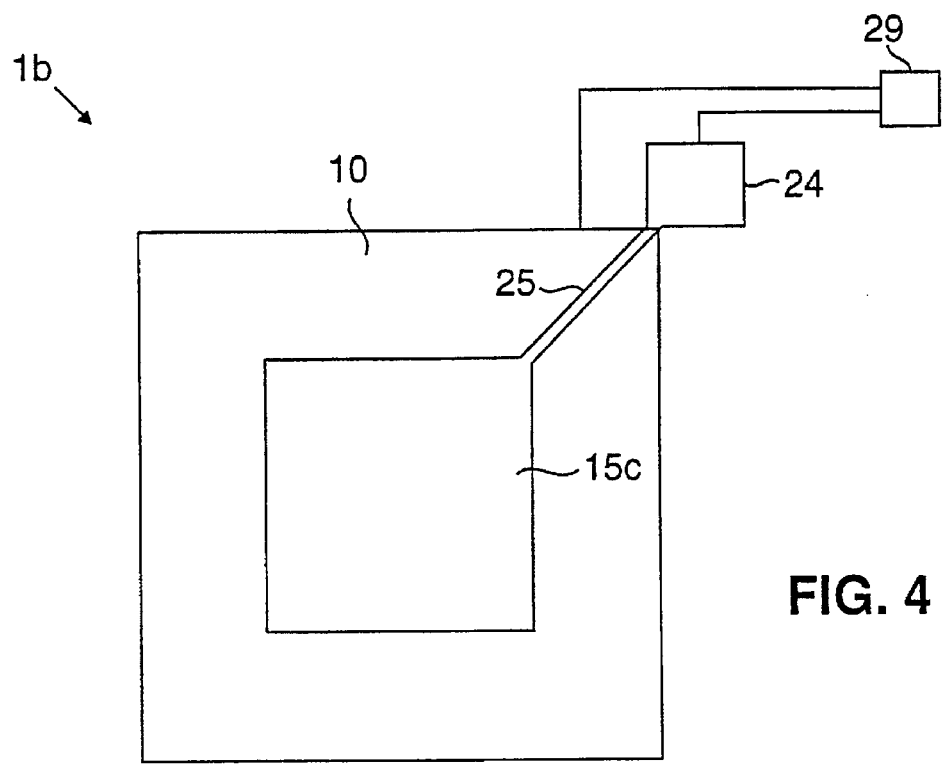
FIG. 4 is a plan view of a third embodiment of a micromechanical modulator according to the present invention wherein the membrane is supported by a cantilever beam.

The flexible support arms 25 that suspend the membrane 15 above the substrate 10 may be arranged in any convenient manner and may number more or less than the four arms pictured in FIGS. 2 and 2a. The flexible support arms 25 serve as a support means for the membrane 15 and also allow the membrane to move relative to the substrate. While a single structure, i.e., the support arms, provides this dual function, these functions could be provided by independent structures. For example, a rigid support used in conjunction with a separate flexing member can provide support and mobility for the membrane 15. Other configurations and arrangements capable of supporting the membrane 15, and allowing it to move, are within the contemplated scope of the present invention; it being recognized that such variations will occur to those skilled in the art in view of the present teachings. In addition, the support arms 25 may be part of the membrane 15, or, alternatively, may be a separate structure formed of a different material. Further, as shown in FIG. 4, a single support arm, i.e., a cantilever support, may be used.

As previously noted, the electrode 30 may comprise a layer of conductive material deposited on the membrane. Any suitably conductive material may be used to form the electrodes, including, without limitation, aluminum, platinum, tungsten, conducting silicon, ITO or, preferably, gold. As shown in FIG. 2a, the electrodes 30 form a continuous conductive layer covering at least a portion of the support arms 25 and the perimeter of the layer 15c forming a border region 17. The inner edge 19 of the border region 17 defines an optical window 16 in the membrane 15 for modulators, such as the modulator 1a, having a discrete electrode 30. Such an optical window is required when the conductive material applied as electrode 30 is not optically transparent at the operating wavelength of the modulator. A distinct optical window 16 is not required in the layer of conductive material when the conductive material is, for example, ITO, since ITO is optically transparent. The electrode 30 may further include a region 24 extending beyond each support arm 25. As shown in FIGS. 1 and 3, a contact 31 may be formed on the substrate 10 to facilitate electrical connection with the controlled voltage source 29. Such a contact point may be provided on the electrode 30 or conductive membrane layer, as well. As previously described, the separate electrode 30 is not required if any of the membrane layers are suitably conductive.

While the optical window 16 is shown to have a circular shape in FIG. 2a, the window 16 may have any shape. The size of the optical window will vary with the particular application for which the invention is used. The optical window 16 must sized so that the optical "spot" produced by the optical window will be captured by the numerical aperture of the waveguide or other optical device being used in conjunction with the invention. It will be appreciated that using conductive membrane layers, rather than a discrete electrode 30, results in a lower moving mass and hence a better response time for the modulator.

Figure 5:
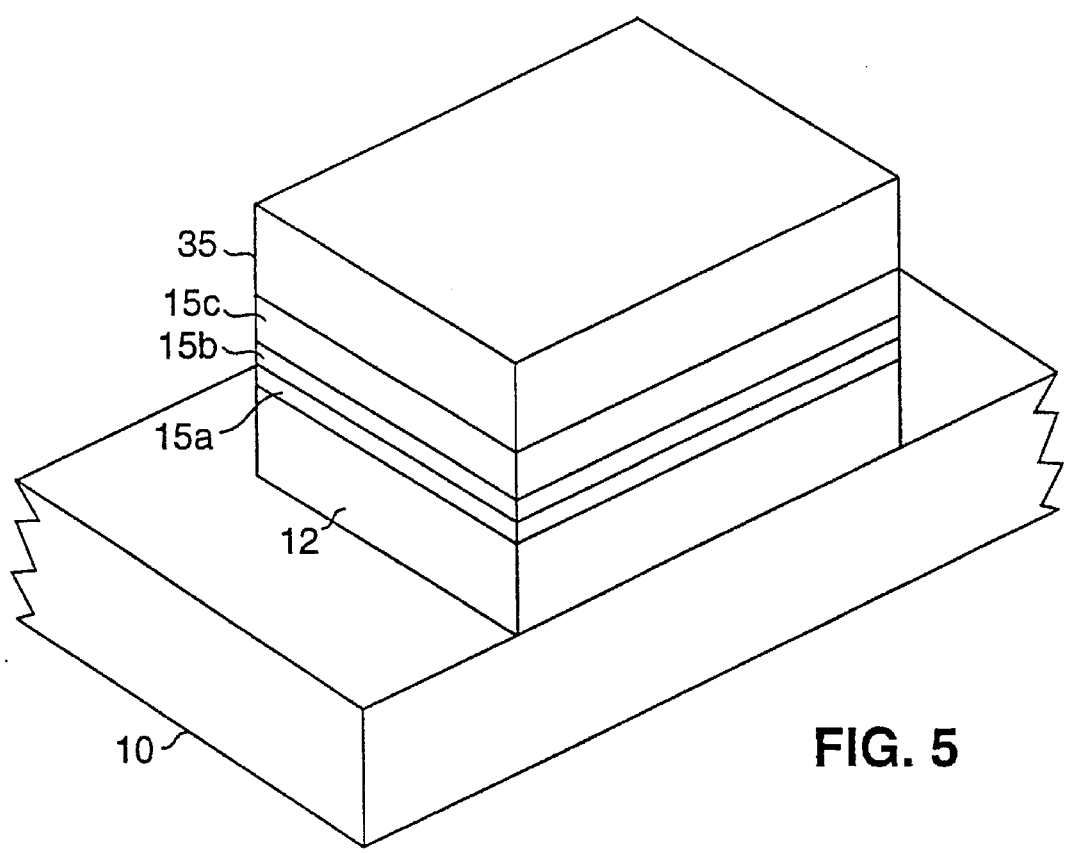
FIG. 5 is a perspective view of various layers of material deposited on a substrate, which layers will be patterned into a micromechanical modulator according to the present invention.

The micromechanical modulator 1 of FIGS. 1 and 2 may be formed as follows. The substrate 10, which may be in the form of a wafer, is preferably silicon which is doped with phosphorus or boron. As shown in FIG. 5, several layers of material, as described below, are deposited on the substrate 10. First, a sacrificial layer 12 of an erodible material is deposited on the substrate. The erodible material is chosen so that a suitable wet etch will erode this material at a much greater rate than any other of the materials which comprise the device. Suitable erodible materials include, but are not limited to, silicon dioxide and aluminum. Preferably, the erodible material is phospho-silicate glass ("PSG"), e.g., silicon dioxide doped with phosphorus. The erodible material is deposited to a thickness approximately equivalent to that desired for the unbiased air gap 20.

A layer of polysilicon or other suitable material is deposited to form layer 15a, as shown in FIG. 5. Next, a suitable material, preferably silicon nitride, is deposited to form the layer 15b. Layers 15a and 15b should be deposited to a thickness equal to about one-quarter of the basis wavelength of the incident optical beam 2 (as measured in the materials comprising the layers). Finally, another layer of polysilicon or other suitable material is deposited to form layer 15c, which layer should be deposited to a thickness equal to about one-half of the basis wavelength (as measured in the materials comprising the layers).

The layer 15b is deposited under conditions so as to achieve a refractive index approximately equal to the square root of the refractive index of the substrate 10. Techniques for tailoring the refractive index of a material are well known to those skilled in the art. See Smith et al., "Mechanism of SiNxHy Deposition from $N_2$—$SiH_4$ Plasma," Jnl. Vac. Sci. Tech. B(8), #3 at 551–57 (1990). The layers 15a and 15c should have refractive indices which are approximately equal to the refractive index of the substrate 10.

Figure 6:
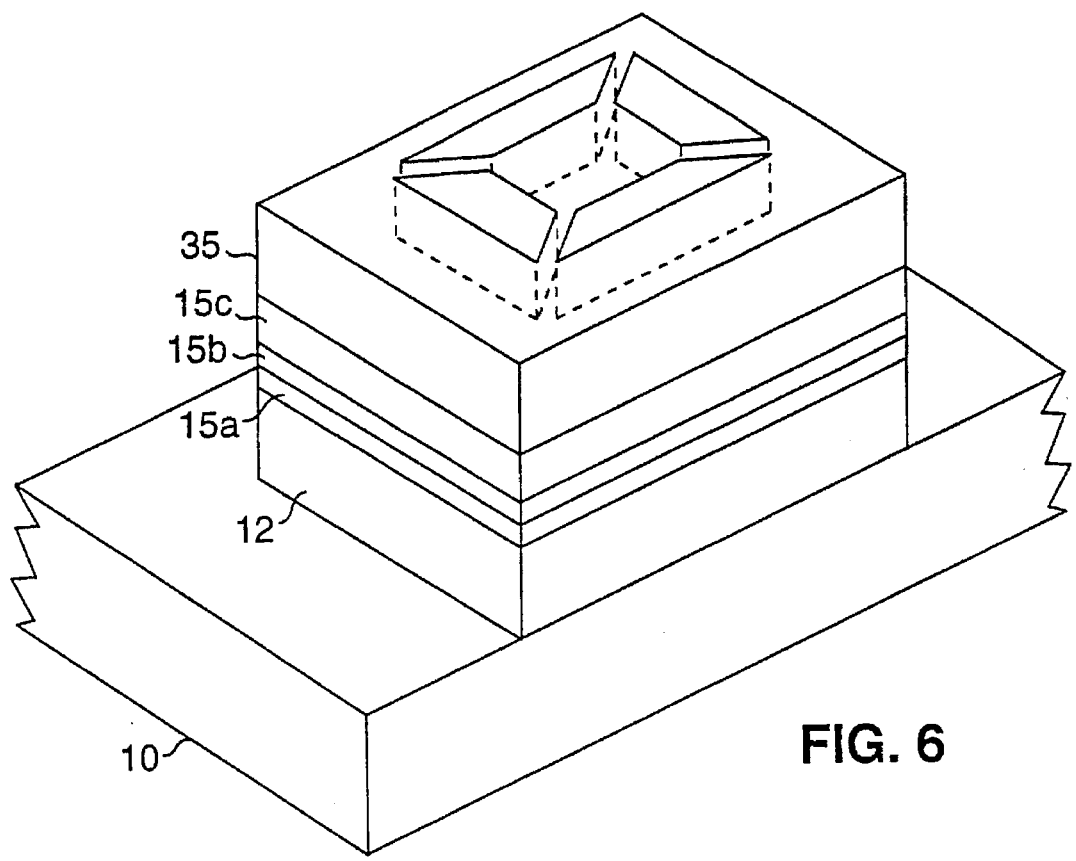
FIG. 6 shows the layers of FIG. 5 with holes patterned in the photoresist layer.

Photolithographic steps follow the deposition of these layers. The photolithographic process is well known to those skilled in the art and the details of this process will not be discussed in detail here. See Ruska, *Microelectronic Processing*, Chap. 4, "Photolithography," at 114–17 (1987). In the first photolithographic step, which may be referred to as the etch step, a photoresist 35 is applied to the uppermost membrane layer, which is the layer 15c in the embodiment shown in FIG. 5. Four openings are then created in the photoresist layer, as shown in FIG. 6, using an appropriately patterned mask. The openings are shown as trapezoidal in shape. The shapes of the openings are a function of the desired support arm arrangement. In the micromechanical modulator 1 shown in FIG. 2, the support arms 25 originate at the corners of a first square and terminate at the corners of a second smaller square (the membrane 15) located within the perimeter of first square. Thus, trapezoidal shaped openings define the structure. As previously discussed, the support arms 25 may be arranged in any convenient manner, may number more or less than four and may have any suitable physical configuration. For other support arm arrangements, the openings created in the photoresist layer may therefore differ in number and shape from those shown in the present example. Small openings, not shown, may be provided near the center of the membrane 15 to facilitate removal of a portion of the sacrificial layer 12 to create the air gap 20.

Figure 7:
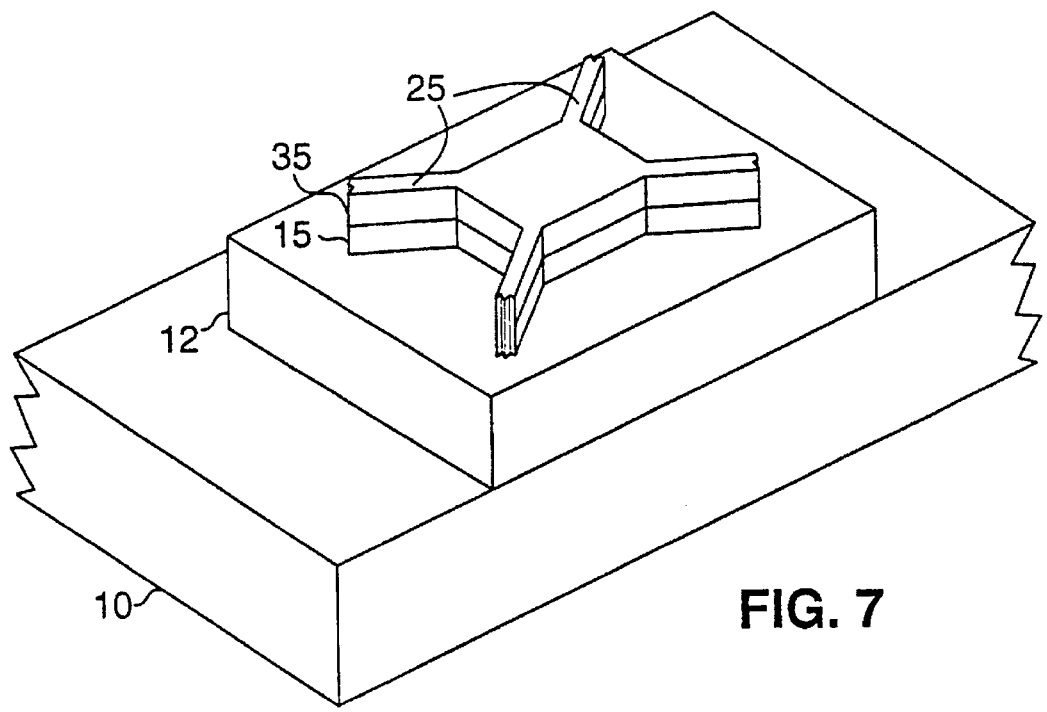
FIG. 7 is a cutaway view of the layers of FIG. 5 after patterning and etching to define the membrane and support arms.

The layers located beneath the trapezoidal openings are removed using reactive ion etching or other suitable methods. By forming four trapezoidal shaped openings in the layers 15a–15c, the support arms 25 and the membrane 15 are defined, as shown in FIG. 7. FIG. 7 is a cutaway view, wherein the material used for the layers 15a–15c and the photoresist surrounding the structure are not shown. It should be understood that the membrane 15 and support arms 25 are surrounded by material comprising layers 15a–15c and 35, other than the trapezoidal shaped regions which have been removed as described.

Figure 8:
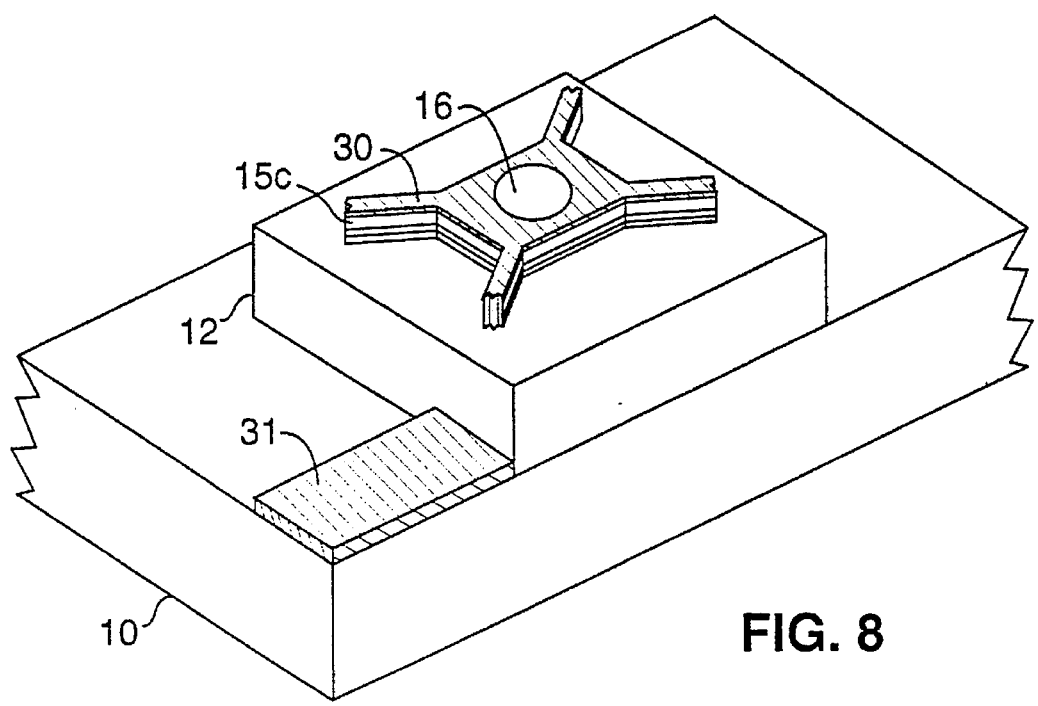
FIG. 8 shows contacts added to the arrangement shown in FIG. 7.

Hardened photoresist remaining on the structure is then removed. If a discrete electrode 30 is to be deposited on the membrane, a second photolithographic step is required. In such a case, photoresist is applied and patterned using a second photomask. The areas of the device which are not to be coated with conductive material are protected by the hardened photoresist. In the embodiment shown in FIG. 8, conductive material is deposited at discrete regions on the layer 15c. Specifically, conductive material may be deposited at a region 24 extending beyond each of the support arms, on the support arms 25 and along the edge of the layer 15c to form the border region 17, as shown in FIG. 3. The conductive material so deposited forms a continuous surface for electrical conduction, defining electrode 30. A contact 31 may also formed on the substrate 10 by depositing conductive material thereon.

Figure 9:
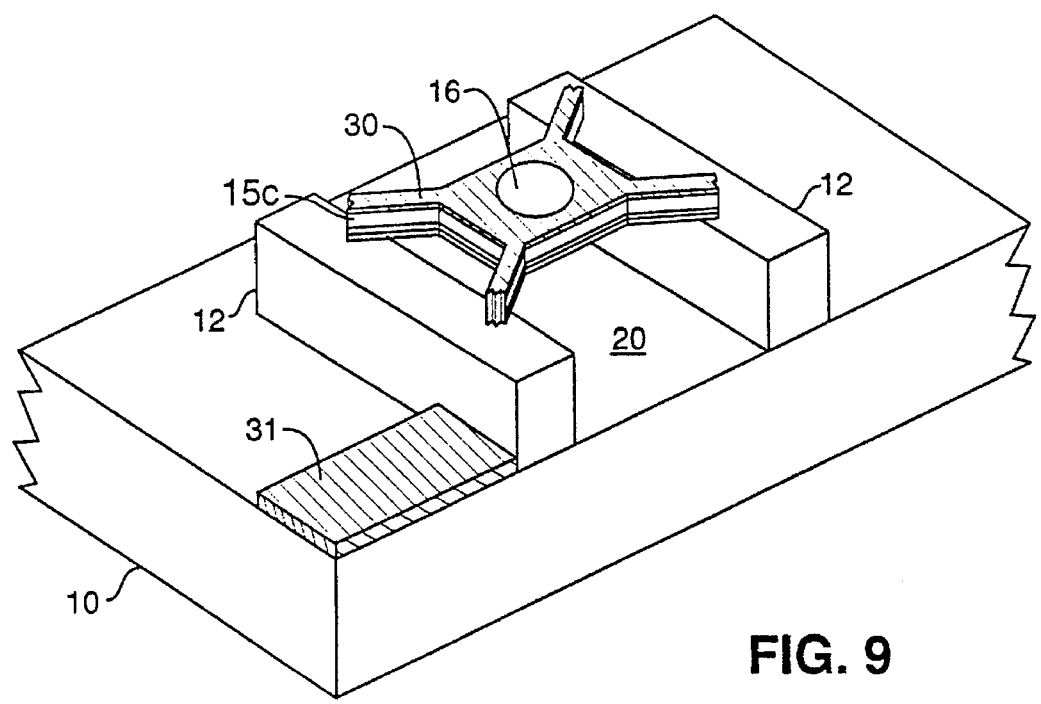
FIG. 9 shows the erodible layer etched away to form an air gap between the membrane and the substrate.

The structure is then placed in a suitable etch bath for etching the sacrificial layer 12 without attacking the silicon nitride. Suitable etches include, but are not limited to, commercial aluminum etchant if the sacrificial layer is aluminum, and HF acid-based solutions for PSG or aluminum sacrificial layers. Forming the layers 15a and 15c from polysilicon allows the use of fast HF acid etches without a protective layer of photoresist. As shown in FIG. 9, the air gap 20 is formed as the portion of the sacrificial layer 12 beneath the membrane 15 and support arms 25 is removed. The etch is timed to limit the amount of undercut of the membrane.

Figure 10:
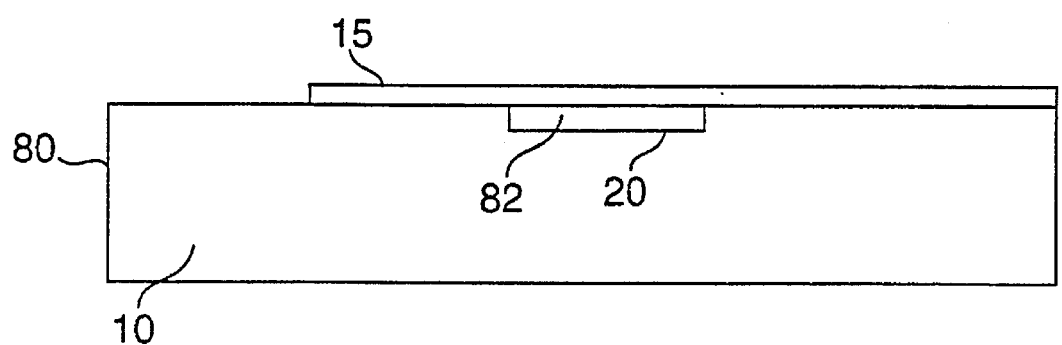
FIG. 10 shows a preferred embodiment of a micromechanical modulator according to the present invention.
Figure 11:
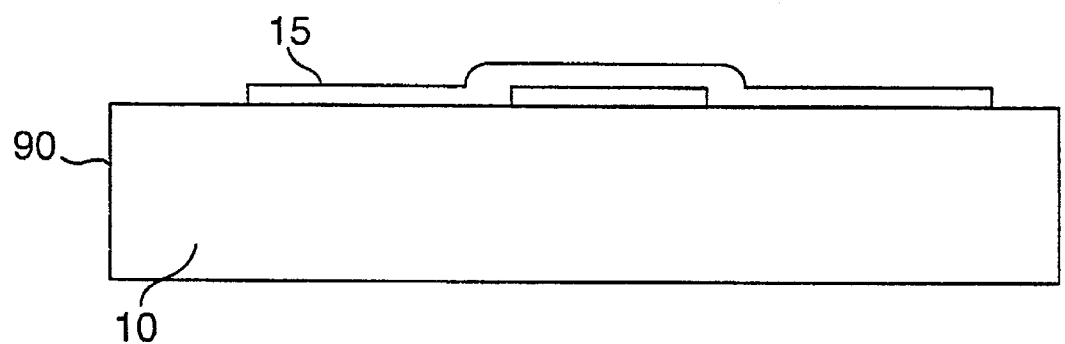
FIG. 11 shows a second preferred embodiment of a micromechanical modulator according to the present invention.

FIGS. 10 and 11 show two preferred embodiments of a micromechanical modulator according to the present invention. FIG. 10 shows a micromechanical modulator 80 wherein a well 82 is formed in the substrate 10. The membrane 15 is formed adjacent to the substrate 10. As in the previous embodiment, the membrane may be comprised of three or more layers, not shown. An air gap 20 is defined in the region where the membrane 15 overlays the well 82. As in the previous embodiment, if none of the membrane layers are suitably conductive, a discrete electrode 30, not shown, is provided on the membrane 15 so that a voltage can be applied to the device 80 generating an electrostatic force between the membrane and the substrate. The membrane 15 and support arms 25 (not shown) of the device 80 may have a configuration like the previous embodiment, or may be configured in other suitable arrangements which may occur to those skilled in the art in view of the teachings provided herein.

To form the micromechanical modulator 80, the well 82 is formed in a suitably prepared substrate 10 using milling or etching techniques known to those skilled in the art. The depth of the well should be equal to the desired thickness of the air gap 20 in the unbiased position. The well 82 is then filled with an erodible material, preferably PSG. Next, the membrane layers 15a–15c are deposited as described for the previous embodiment. Photoresist is applied and patterned to form the membrane 15 and support arms 25 as previously discussed. The erodible material is etched away, resulting in the air gap 20. The well 82 defines the boundaries of the air gap, i.e., the extent of the etch, so that attention to the timing of the etch is not as critical as for the previous embodiment.

In a preferred embodiment for forming the micromechanical modulator 80, a silicon nitride layer is formed on a silicon wafer. An opening is formed in the silicon nitride layer down to the silicon wafer, at the intended site for the well 82. The opening may be formed using reactive ion etching or other methods known to those skilled in the art. The wafer, with the etched silicon nitride layer, is then placed in a thermal oxidation furnace. Silicon which is exposed to the atmosphere in the furnace, i.e., the silicon exposed as a result of the opening which is formed as described above, is oxidized. The oxide grows into the silicon wafer. This is the functional equivalent of filling the well 82 with silicon dioxide. Thermal oxidation is well characterized and understood by those skilled in the art. Through the appropriate combination of exposure time, furnace temperature and environment, the oxide penetration of the silicon wafer can be controlled to the desired depth, i.e., that depth which results in a suitable air gap 20 upon removal of the silicon oxide. The silicon oxide can be ion-implanted with phosphorus or boron and phosphorous to enhance its solubility in HF-based solutions to facilitate removal, if desired. After removing the silicon nitride layer, material appropriate for forming the layers 15a–15c, such as polysilicon and silicon nitride, is applied to the wafer. The layers are then patterned and etched, an electrode is deposited if none of the membrane layers are conductive, and the silicon oxide is removed to form the well 82 which results in an air gap 20 between the layer 15a and the substrate 10, i.e., the silicon wafer.

Figure 12:
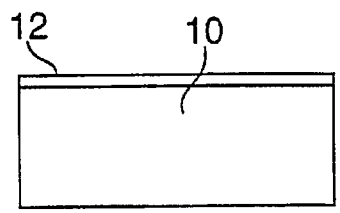
Figure 13:
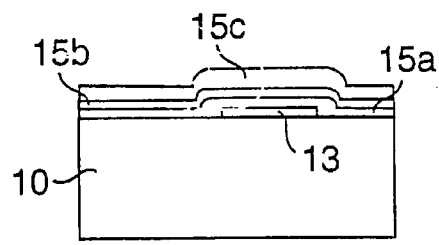
Figure 14A:
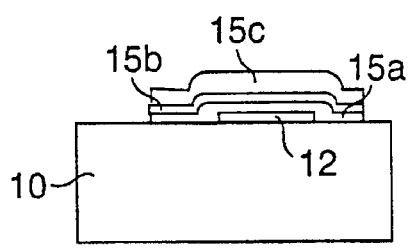
Figure 14B:
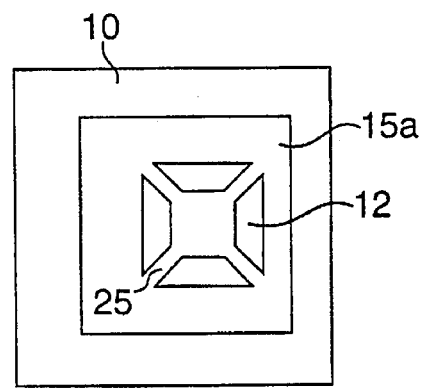
Figure 15A:
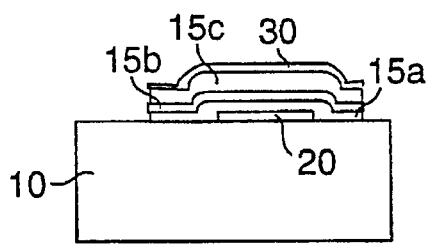
Figure 15B:
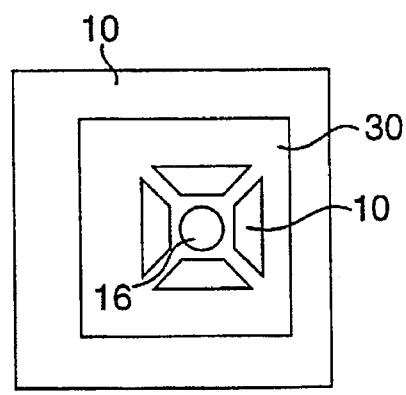

FIG. 11 shows a second preferred embodiment of a micromechanical modulator 90 according to the present invention. Rather than forming a well in the substrate to create the air gap 20, as in the previous embodiment, an "island" 13 of erodible material is formed on the substrate 10 which will be etched away to form the air gap 20. An exemplary embodiment of a method of making the micromechanical modulator 90 is illustrated in FIGS. 12–15b. As shown in FIG. 12, an appropriately prepared substrate 10 is coated with a sacrificial layer 12 of erodible material. The sacrificial layer 12 is patterned into an "island" 13 having the dimensions desired for the air gap 20, shown in FIG. 13. The layers 15a–15c are next deposited on the island 13 of erodible material. These layers extend beyond the island 13 onto the substrate 10. Photoresist is applied and the layers 15a–15c are patterned into the membrane shape, as shown in cross section in FIG. 14a and in a plan view in FIG. 14b. Next, the electrode 30 is deposited and patterned, if appropriate. Finally, the erodible material is removed from beneath the layers 15a–15c, forming an air gap 20 between the layers and the substrate 10. The etch to remove the erodible material proceeds until the material forming the layer 15a is encountered. As in the previous embodiment, this simplifies forming an air gap relative to a timed etch. FIGS. 15a and 15b show the fully formed micromechanical modulator 90, including an electrode 30.

The devices 1, 1a, 1b, 80 and 90 function as previously described. In a preferred embodiment of such modulators, the membrane 15 does not contact the substrate 10. Modulators according to the present invention, such as the modulators 1, 1a, 1b, 80 and 90, have been described as having a membrane comprising three layers 15a–15c. Other modulators having a membrane with more than three layers of appropriate refractive index and thickness may realize the benefits of the present invention, as well. Such designs are within the contemplated scope of the present invention.

Figure 16:
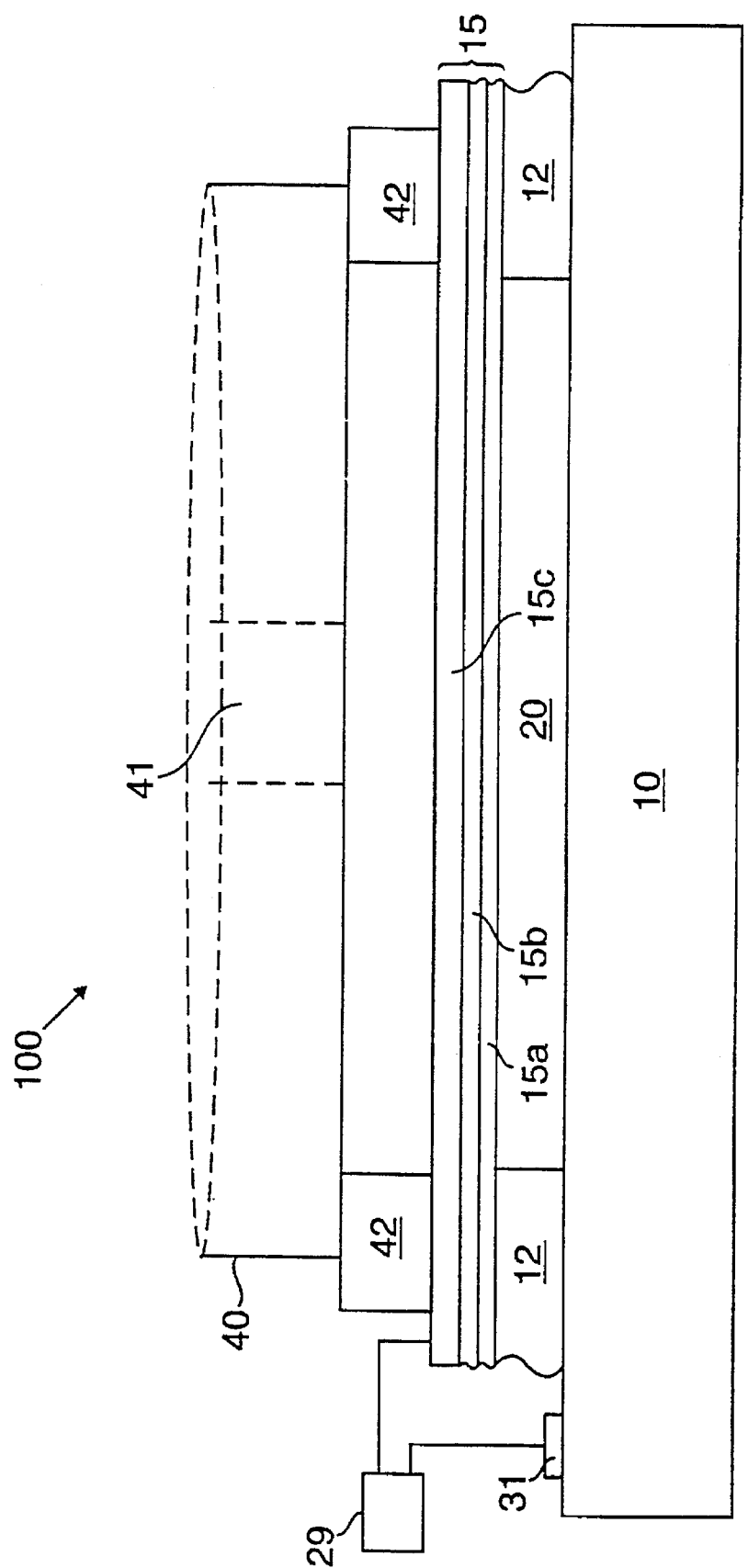
FIG. 16 is a side view of an embodiment of a modulator according to the present invention which incorporates an optical fiber.
Figure 17:
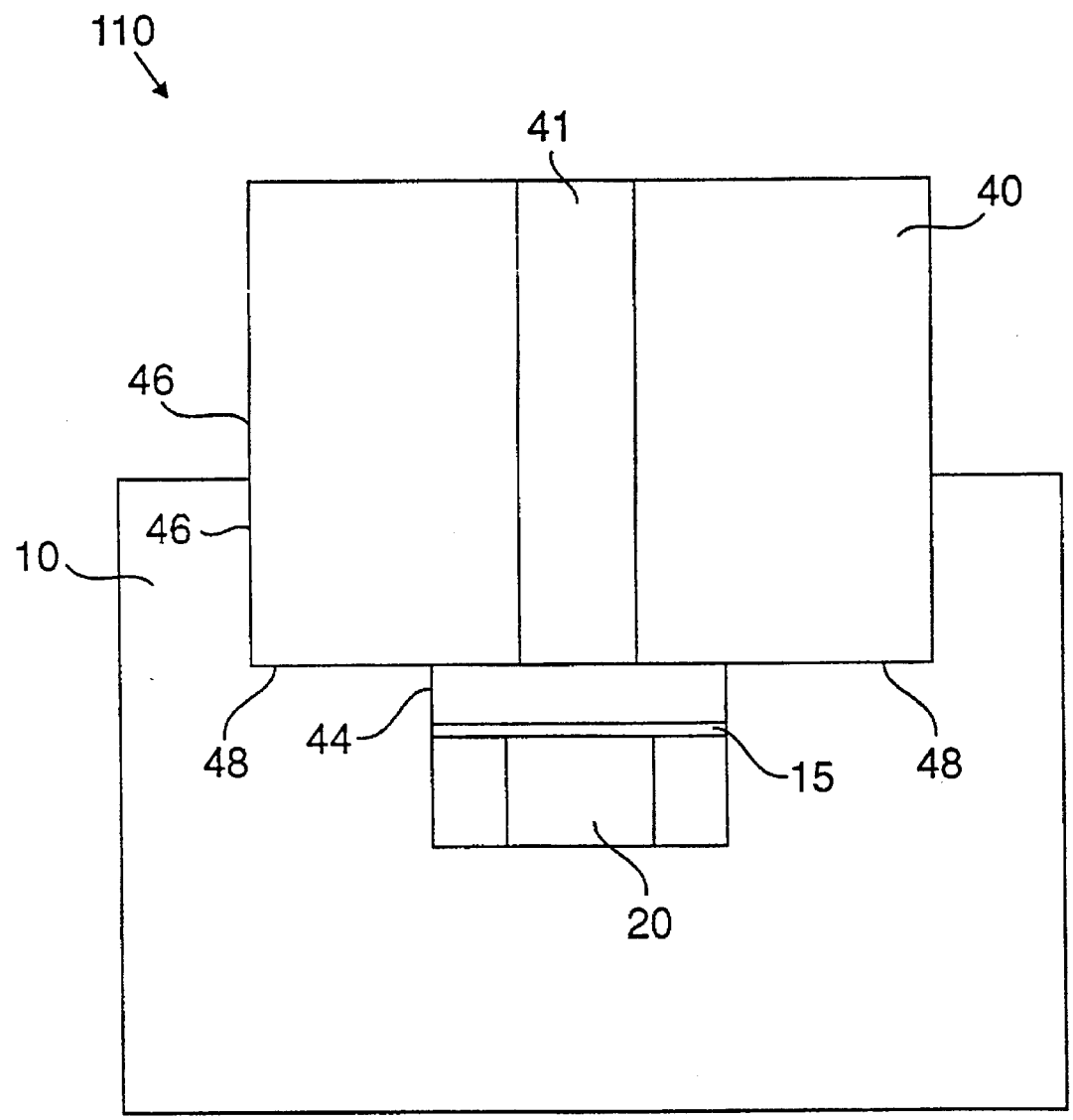
FIG. 17 is a side view of a second embodiment of a modulator according to the present invention which incorporates an optical fiber.

In other embodiments, illustrated in FIGS. 16 & 17, a micromechanical modulator according to the present invention comprises a membrane 15 and air gap 20, as well as an optical fiber 40 spaced from the membrane 15 to facilitate use in an optical fiber network. For example, as shown in FIG. 16, a modulator 100 may be fabricated by depositing an electrically insulating material such as silicon dioxide in an annular shape around the modulator 100 to form a support 42 for the fiber 40. Epoxy or other adhesive material may be used to cement the fiber 40 to the support 42. The fiber 40 is positioned at an odd or even multiple of one-quarter of the basis wavelength above the top of the unbiased membrane 15. If the fiber is positioned at an odd multiple of one-quarter of the basis wavelength above the unbiased membrane, then the air gap 20 between the unbiased membrane 15 and the substrate 10 is preferably an odd multiple of one-quarter of the basis wavelength. Similarly, if the fiber is at an even multiple of one-quarter of the basis wavelength above the top of the unbiased membrane 15, then the air gap 20 between the unbiased membrane 15 and the substrate 10 is preferably an even multiple of one-quarter of the basis wavelength. In a presently preferred embodiment, the gap between the fiber 40 and the unbiased membrane 15 is $\lambda/4$ and the air gap 20 between the unbiased membrane 15 and the substrate 10 ranges from about $0.65\lambda$ to about $0.7\lambda$. The fiber 40 is preferably positioned so that the optical fiber core 41 is normal to, and in optical communication with, the membrane 15. If a discrete optical window 16 is present in the membrane 15, the fiber 40 must be in optical communication with the optical window.

In another embodiment of a micromechanical modulator 110, two wells, such as wells 44 and 46, are formed in a substrate 10 as shown in FIG. 17. In the well 44, a membrane 15 and an air gap 20 are formed according to any of the methods previously disclosed. Well 46 is sized to receive an optical fiber 40. The annular surface 48 created by the formation of the two wells 44, 46 supports the fiber 40 above the membrane 15. As in the previous embodiment, the fiber 40 is positioned an odd or even multiple of one-quarter of the basis wavelength above the top of the unbiased membrane 15, with the air gap 20 having a complementary position as previously described. Again, the gap between the fiber 40 and the unbiased membrane 15 is preferably $\lambda/4$ and the air gap 20 between the unbiased membrane 15 and the substrate 10 ranges from about $0.65\lambda$ to about $0.7\lambda$. Further, the fiber core 41 is normal to, and in optical communication with, the membrane 15 or the optical window 16 if present.

If the micromechanical modulator includes an optical fiber, such as for the modulators 100 and 110, the layer 15b is characterized by a refractive index which is approximately equal to the square root of the product of the refractive indices of the substrate 10 and the fiber 40.

It is preferred that modulators according to the present invention are formed and operated so that under the action of bias the membrane 15 moves towards the substrate 10. In other words, the size of the air gap 20 decreases under bias. Alternatively, it is within the contemplated scope of this invention that modulators be formed and operated so that the membrane 15 moves away from the substrate 10 under the action of bias, i.e., the air gap 20 increases. The optical properties of both versions are the same.

Such a modulator may be formed by suspending an electrode, such as a ring of conductive material, above the membrane 15, i.e., on the side of the membrane furthest from the substrate. By applying a bias voltage across the ring and the membrane 15, an electrostatic attraction will be created, moving the membrane 15 toward the ring, and away from the substrate. The electrode is not limited to a ring of conductive material. However, the configuration should be such that the optical signal will pass through the electrode with minimal signal attenuation.

Alternatively, a bias current rather than a voltage, may be supplied to the modulators discussed previously in this specification, such as modulators 1, 1a, 80, 90, 100 and 110. The current can be controlled to produce a magnetic repulsion between the membrane 15 and substrate 10 so that the membrane will move away from the substrate under the action of bias.

The performance of a modulator having a three layer membrane has been modeled in FIG. 18. The basis for the simulation is as follows. The upper and lower layers of the membrane are assumed to be comprised of polysilicon, and the middle layer is assumed to be comprised of silicon nitride. The signal being modulated is assumed to have a bandwidth extending from 1400 nm to 1700 nm. Thus, the basis wavelength ($\lambda$) is 1550 nm. The membrane 15 has a layer of silicon nitride which is 2072 angstroms (207.2 nanometers) thick and has a refractive index of 1.87. Thus, the thickness of the layer is $\lambda/4$ ((207.2×1.87)/1550). The lower and upper layer of polysilicon have a thickness of 1107 angstroms and 2214 angstroms, respectively and a refractive index of 3.5. Thus, the thickness of the lower layer is $\lambda/4$ and the thickness of the upper layer is $\lambda/2$. The substrate is silicon with a refractive index of 3.5. As required, the refractive index of the middle layer of silicon nitride is approximately equal to the square root of the refractive index of the substrate.

FIG. 18 shows the reflectivity of the device as a function of wavelength for several air gaps. An anti-reflection state is shown at reference numeral 50, which corresponds to an air gap of $\lambda/2$. A maximum reflectivity state is shown at reference numeral 60, which corresponds to an air gap of $3\lambda/4$. A high, but not maximum, reflectivity state is shown at reference numeral 56, which corresponds to an air gap of about $0.65\lambda$.

Modulator performance may be evaluated from FIG. 18. When the air gap is $3\lambda/4$, shown at reference numeral 60, reflectivity is about seventy two percent at the basis wavelength. When the air gap is equal to $\lambda/2$, shown at reference numeral 50, reflectivity approaches zero reflectivity over the range of about 1510 to 1590 nm. Thus, contrast, i.e., the ratio of light reflected in the two states, is quite high over a bandwidth of approximately 80 to 100 nm. Such a bandwidth is broad enough to support a number of channels in a optical wavelength-division-multiplexing network.

As previously described, a modulator operating with an unbiased air gap of $3\lambda/4$ moving to a biased air gap of $\lambda/2$ will be subject to an instability which causes the membrane to snap down to the substrate. Thus, a preferred design has an unbiased air gap of about $0.65\lambda$, the reflectance curve of which is shown at reference numeral 56. As shown in FIG. 18, reflectivity at the basis wavelength is about sixty-two percent, which is about eighty six percent of the reflectivity at $3\lambda/4$. While some reflectivity is sacrificed, the instability is avoided since $(0.65\lambda-0.5\lambda)/0.65\lambda<0.33$. Further, regardless of the loss in reflectivity, contrast remains very high.

It should be understood that the embodiments and variations shown and described herein are illustrative of the principles of this invention and that various modifications may occur to, and be implemented by, those skilled in the art without departing from the scope and spirit of the invention.

We claim:

1. A modulator for modulating an optical signal comprising:

a substrate characterized by a refractive index;

a membrane having an optically transparent portion and comprising at least three layers of material, the first of which layers has a refractive index which is approximately equal to the refractive index of the substrate and a thickness approximately equal to one-quarter of a wavelength of the optical signal, as measured within the first layer, the second of which layers has a refractive index which is approximately equal to the square root of the refractive index of the substrate and a thickness approximately equal to one-quarter of a wavelength of the optical signal, as measured within the second layer, the third of which layers has a refractive index which is approximately equal to the refractive index of the substrate and a thickness approximately equal to one-half of a wavelength of the optical signal, as measured within the third layer;

a flexible support for positioning the membrane in a first position wherein the membrane is oriented in spaced and superposed relation to the substrate defining an air gap, and wherein, of the at least three layers, the first layer is proximal to the substrate and the third layer is distal to the substrate; and a means for supplying bias to the membrane and substrate;

wherein, under the action of bias, the membrane moves to a second position, changing the air gap, where the change from the first to the second position causes a change in the amount of the optical signal that is reflected from the membrane.

2. The modulator of claim 1 wherein, under the action of bias, the flexible support flexes and the membrane moves toward the substrate.

3. The modulator of claim 1 wherein the substrate is a semiconductor.

4. The modulator of claim 1 wherein the substrate is silicon.

5. The modulator of claim 1 wherein the second layer of material is silicon nitride.

6. The modulator of claim 1 wherein the first layer of material is polysilicon.

7. The modulator of claim 1 wherein the third layer of material is polysilicon.

8. The modulator of claim 1 wherein the air gap in the first position ranges from approximately sixty-five to seventy percent of the wavelength of the optical signal and the air gap in the second position is approximately fifty percent of the wavelength of the optical signal, as measured in air.

9. The modulator of claim 1 wherein at least a portion of the membrane is coated with a conductive material which is selected from the group consisting of aluminum, gold, platinum, tungsten, ITO and conducting silicon.

10. The modulator of claim 1 wherein at least one of the first or the third layer of material is conductive.

11. The modulator of claim 1 wherein the substrate is conductive.

12. The modulator of claim 2 wherein the flexible support comprises a plurality of flexible support arms.

13. The modulator of claim 12 wherein at least a portion of the flexible support arms are conductive.

14. A modulator for modulating an optical signal comprising:

a substrate characterized by a refractive index;

an optical fiber having a first end in optical communication with an optically transparent portion of a membrane;

the membrane comprising at least three layers of material,
the first of which layers has a refractive index which is approximately equal to the refractive index of the substrate and a thickness approximately equal to one-quarter of a wavelength of the optical signal, as measured within the first layer, the second of which layers has a refractive index which is approximately equal to the square root of the product of the refractive indices of the substrate and the optical fiber and a thickness approximately equal to one-quarter of a wavelength of the optical signal, as measured within the second layer, the third of which layers has a refractive index which is approximately equal to the refractive index of the substrate and a thickness approximately equal to one-half of a wavelength of the optical signal, as measured within the third layer, a flexible support for positioning the membrane in a first position wherein the membrane is oriented in spaced and superposed relation to the substrate, defining an air gap, and wherein the first end of the optical fiber is in superposed relation to the membrane and is spaced from the membrane by approximately an integer multiple of one-quarter of a wavelength of the optical signal, as measured in air, and wherein, of the at least three layers, the first layer is proximal to the substrate and distal to the optical fiber and the third layer is distal to the substrate and proximal to the optical fiber; and a means for supplying a biasing force to the membrane and substrate, wherein, under the action of the biasing force, the membrane moves to a second position, where the change from the first to the second position causes a change in the amount of the optical signal that is reflected from the membrane.

15. The modulator of claim 14 wherein in the first position of the membrane, the air gap ranges from about sixty-five to seventy percent of the wavelength of the optical signal and in the second position the air gap is about fifty percent of the wavelength of the optical signal.

16. The modulator of claim 15 wherein the first and third layers are formed of polysilicon and the second layer is formed of silicon nitride.

17. A device which, under the action of an applied biasing force, has a variable reflectivity to an incident optical signal received by the device, comprising:

a substrate;

a membrane having an optically transparent portion and comprising at least three layers of material,
the first of which layers has a refractive index which is approximately equal to the refractive index of the substrate and a thickness approximately equal to one-quarter of a wavelength of the optical signal, as measured within the first layer, the second of which layers has a refractive index which is approximately equal to the square root of the refractive index of the substrate and a thickness approximately equal to one-quarter of a wavelength of the optical signal, as measured within the second layer, the third of which layers has a refractive index which is approximately equal to the refractive index of the substrate and a thickness approximately equal to one-half of a wavelength of the optical signal, as measured within the third layer;

a flexible support for supporting the membrane in spaced and superposed relation to the substrate forming an air gap having a size which varies from a first size in the absence of the biasing force to at least a second size when the biasing force is applied, wherein, of the at least three layers, the first layer is proximal to the substrate and the third layer is distal to the substrate.

18. The modulator of claim 17 wherein in the first position of the membrane, the air gap ranges from about sixty-five to seventy percent of the wavelength of the optical signal.

19. The modulator of claim 18 wherein the first and third layers are formed of polysilicon and the second layer is formed of silicon nitride.

20. A method for varying reflectivity of a device to an optical signal, comprising the steps of:

providing a device comprising a membrane and a substrate in spaced, superposed relation defining an air gap, the membrane having an optically transparent portion and comprising at least three layers of material,
the first of which layers has a refractive index which is approximately equal to the refractive index of the substrate and a thickness approximately equal to one-quarter of a wavelength of the optical signal, as measured within the first layer, the second of which layers has a refractive index which is approximately equal to the square root of the refractive index of the substrate and a thickness approximately equal to one-quarter of a wavelength of the optical signal, as measured within the second layer, the third of which layers has a refractive index which is approximately equal to the refractive index of the substrate and a thickness approximately equal to one-half of a wavelength of the optical signal, as measured within the third layer;

exposing the device to an optical signal; and applying a biasing force to the device causing the membrane to move towards the substrate thereby changing the size of the air gap and the reflectivity of the device.

21. The method of claim 20 wherein the membrane moves from a first position to a second position when the biasing force is applied, and further wherein the step of providing a membrane further comprises spacing the membrane and substrate so that in the first position, the air gap is about sixty-five to seventy percent of the optical signal, as measured in air.

22. The method of claim 20 wherein the step of applying a biasing force comprises moving the membrane to the second position wherein the air gap is an even integer multiple of one quarter of the optical signal.

23. A method for fabricating a device having a low and a high reflectivity state for modulating an optical signal, comprising the steps of:

providing a substrate; and forming a vertically-movable membrane over the substrate so that an air gap is defined between the membrane and a portion of the substrate, the membrane having an optically transparent portion and comprising at least three layers of material,
the first of which layers has a refractive index which is approximately equal to the refractive index of the substrate and a thickness approximately equal to one-quarter of a wavelength of the optical signal, as measured within the first layer, the second of which layers has a refractive index which is approximately equal to the square root of the refractive index of the substrate and a thickness approximately equal to one-quarter of a wavelength of the optical signal, as measured within the second layer, the third of which layers has a refractive index which is approximately equal to the refractive index of the substrate and a thickness approximately equal to one-half of a wavelength of the optical signal, as measured within the third layer.

24. The method of claim 23 wherein the step of forming a vertically-movable membrane further comprises forming the first and third layers from a material suitable for protecting the second layer during fabrication of the device and wherein, of the at least three layers, the first layer is proximal to the substrate.

25. The method of claim 23 wherein the step of forming a vertically-movable membrane further comprises spacing the membrane from the substrate so that the air gap ranges from approximately sixty-five to seventy percent of the wavelength of the optical signal, as measured in air.

* * * * *